United States Patent
Zhu

(10) Patent No.: US 11,254,326 B2
(45) Date of Patent: Feb. 22, 2022

(54) AUTOMATIC COMFORT SCORE SYSTEM BASED ON HUMAN DRIVING REFERENCE DATA

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 74 days.

(21) Appl. No.: 16/889,588

(22) Filed: Jun. 1, 2020

(65) Prior Publication Data

US 2021/0370962 A1    Dec. 2, 2021

(51) Int. Cl.
*B60W 50/04* (2006.01)
*B60W 60/00* (2020.01)
*B60W 50/08* (2020.01)

(52) U.S. Cl.
CPC ........ *B60W 50/045* (2013.01); *B60W 50/085* (2013.01); *B60W 60/0013* (2020.02); *B60W 2520/105* (2013.01)

(58) Field of Classification Search
CPC ....... B60W 60/0013; B60W 60/00133; B60W 60/0136; B60W 60/0139; B60W 30/025; B60W 50/0098; B60T 8/17555; G05D 1/0291; G05D 1/0293; G05D 1/0295; G05D 1/0297; G08G 1/22
See application file for complete search history.

(56) References Cited

U.S. PATENT DOCUMENTS

| | | | | |
|---|---|---|---|---|
| 9,914,460 | B2* | 3/2018 | Hunt | B60W 30/08 |
| 10,850,693 | B1* | 12/2020 | Pertsel | B60R 16/037 |
| 2016/0159366 | A1* | 6/2016 | Tsuyunashi | B60W 40/09 340/439 |
| 2016/0288797 | A1* | 10/2016 | Takahashi | G07C 5/0825 |
| 2017/0103121 | A1* | 4/2017 | Mori | G09B 9/042 |
| 2018/0203453 | A1* | 7/2018 | Hardy | G05D 1/0214 |
| 2018/0215391 | A1* | 8/2018 | Chen | G01N 33/42 |
| 2019/0241198 | A1* | 8/2019 | Mori | B60W 50/14 |
| 2020/0079355 | A1* | 3/2020 | Chen | B60W 30/025 |
| 2020/0242421 | A1* | 7/2020 | Sobhany | G06K 9/6292 |
| 2020/0272922 | A1* | 8/2020 | Tohriyama | G08G 1/0112 |
| 2020/0298892 | A1* | 9/2020 | Raichelgauz | G08G 1/09675 |
| 2021/0179118 | A1* | 6/2021 | Alt | G06N 5/04 |
| 2021/0269051 | A1* | 9/2021 | McGill, Jr. | G06N 3/0454 |

* cited by examiner

*Primary Examiner* — Thomas G Black
*Assistant Examiner* — Sara J Lewandroski
(74) *Attorney, Agent, or Firm* — Womble Bond Dickinson (US) LLP

(57) ABSTRACT

Sensor data obtained from a plurality of sensors mounted on an ADV driving on a route is collected. A set of features from the sensor data are extracted, where the set of features including an acceleration and a speed of the ADV driving on the route. A first similarity between the ADV and a first driving behavior associated with a first type of drivers driving on the route is determined based on the set of features. A second similarity between the ADV and a second driving behavior associated with a second type of drivers driving on the route is determined based on the set of features. A comfort score of the ADV based on the first similarity and the second similarity is determined to evaluate a motion planning and control of the ADV.

20 Claims, 8 Drawing Sheets

… (1)

AUTOMATIC COMFORT SCORE SYSTEM BASED ON HUMAN DRIVING REFERENCE DATA

TECHNICAL FIELD

Embodiments of the present disclosure relate generally to operating autonomous driving vehicles. More particularly, embodiments of the disclosure relate to a riding comfort of an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. It is important for a passenger to have a comfortable ride and enjoy a riding experience. However, a riding comfort of an ADV, if being measured subjectively, usually requires a large number of test rides, as subjective measurements may be not consistent and may not be accurate.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method to objectively calculate a comfort score of an ADV is provided. Data of a first driving behavior associated with a first type of drivers (e.g., good human drivers) and a second driving behavior associated with a second type of drivers (e.g., bad human drivers) driving on a same route may be collected. Information (e.g., acceleration, speed) from the collected data may be extracted. In one embodiment, a distribution of acceleration and speed pairs of the first driving behavior (e.g., good human drivers) and a distribution of acceleration and speed pairs of the second driving behavior the second driving behavior (e.g., bad human drivers) may be calculated. Data from the ADV driving on the same route may be collected. In one embodiment, a distribution of acceleration and speed pairs of the ADV may be calculated. A first similarity score to the first driving behavior and a second similarity score to second first driving behavior may be calculated. A comfort score of the ADV may be calculated based on the first similarity score and the second similarity score.

According to some embodiments, sensor data obtained from a plurality of sensors mounted on an ADV driving on a route is collected. A set of features from the sensor data are extracted, where the set of features including an acceleration and a speed of the ADV driving on the route. A first similarity between the ADV and a first driving behavior associated with a first type of drivers driving on the route is determined based on the set of features. A second similarity between the ADV and a second driving behavior associated with a second type of drivers driving on the route is determined based on the set of features. A comfort score of the ADV based on the first similarity and the second similarity is determined to evaluate a motion planning and control of the ADV.

Figure 1:
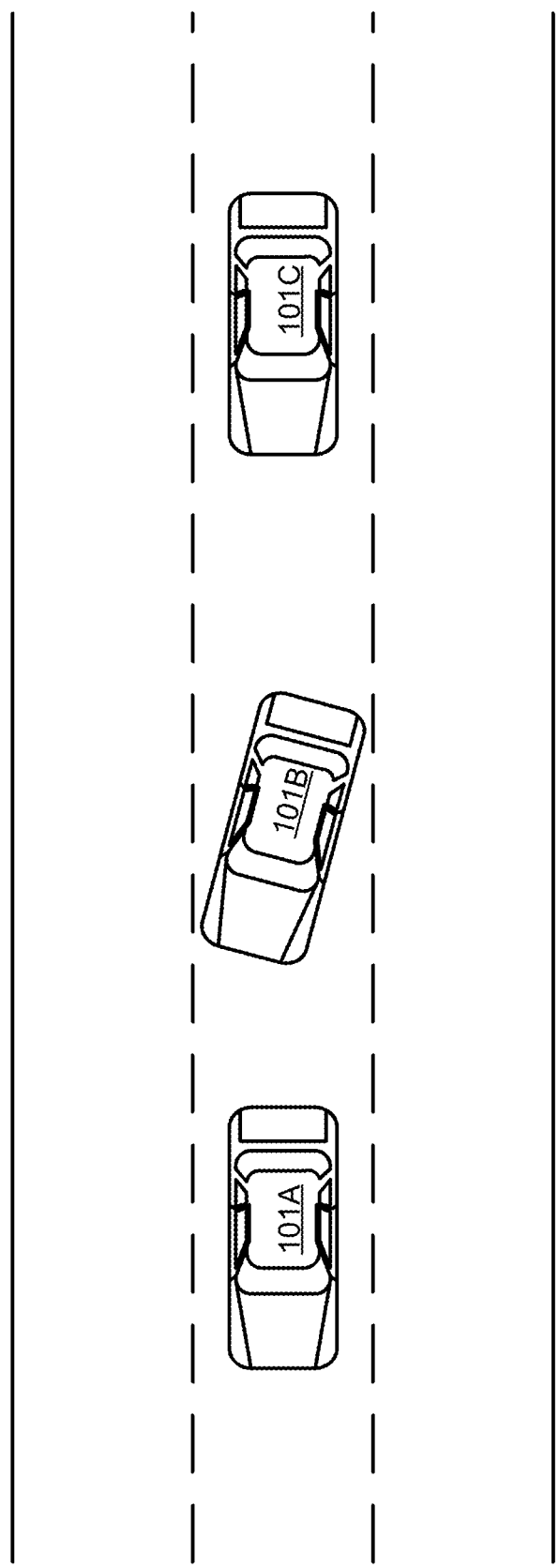
FIG. 1 is a diagram illustrating different driving behaviors.

FIG. 1 is a diagram illustrating different driving behaviors. Riding comfort is important for a passenger to have an enjoyable riding experience. However, riding comfort is usually evaluated by subjective measurements. If measured subjectively, an evaluation of riding comfort, usually requires a large number of test rides, as subjective measurements may be not consistent and have a lot of noises. The large number of test rides may take a lot of time. Furthermore, when trying to improve a riding comfort level of an ADV, subjective measurements may not be accurate enough to distinguish a small difference of the riding comfort. There may be a need to develop a method to objectively calculate a comfort score of the ADV to overcome the above problems.

As shown in FIG. 1, a vehicle 101A may be driving by one of a first type of drivers, e.g., good human drivers, who have a first driving behavior, e.g., good driving behavior; a vehicle 101B may be driving by one of a second type of drivers, e.g., bad human drivers, who have a second driving behavior, e.g., bad driving behavior. The first driving behavior and the second driving behavior may be different in throttle/brake behaviors. For example, the vehicle 101A may be driving with the first driving behavior (e.g., good driving behavior), including smaller and less frequent accelerations, and/or reasonable speeds, while the vehicle 101B may be driving with the second driving behavior (e.g., bad driving behavior), including larger and more frequent accelerations, and/or higher speeds. Features representing throttle/brake behaviors may be used to evaluate a riding comfort of an ADV.

For an ADV 103C, if an autonomous driving behavior of the ADV is more similar to the first driving behavior (e.g., good driving behavior) of 101A on a same route, the ADV 103C may have a more comfortable riding experience; while if the autonomous driving behavior of the ADV is more similar to the second driving behavior (e.g., bad driving behavior) of 101A on the same route, the ADV 103C may have a less comfortable riding experience. Thus, the riding comfort of the ADV may be evaluated by comparing the autonomous driving behavior of the ADV to the first driving behavior (e.g., good driving behavior) and to the second driving behavior (e.g., bad driving behavior) on a same route.

Figure 2:
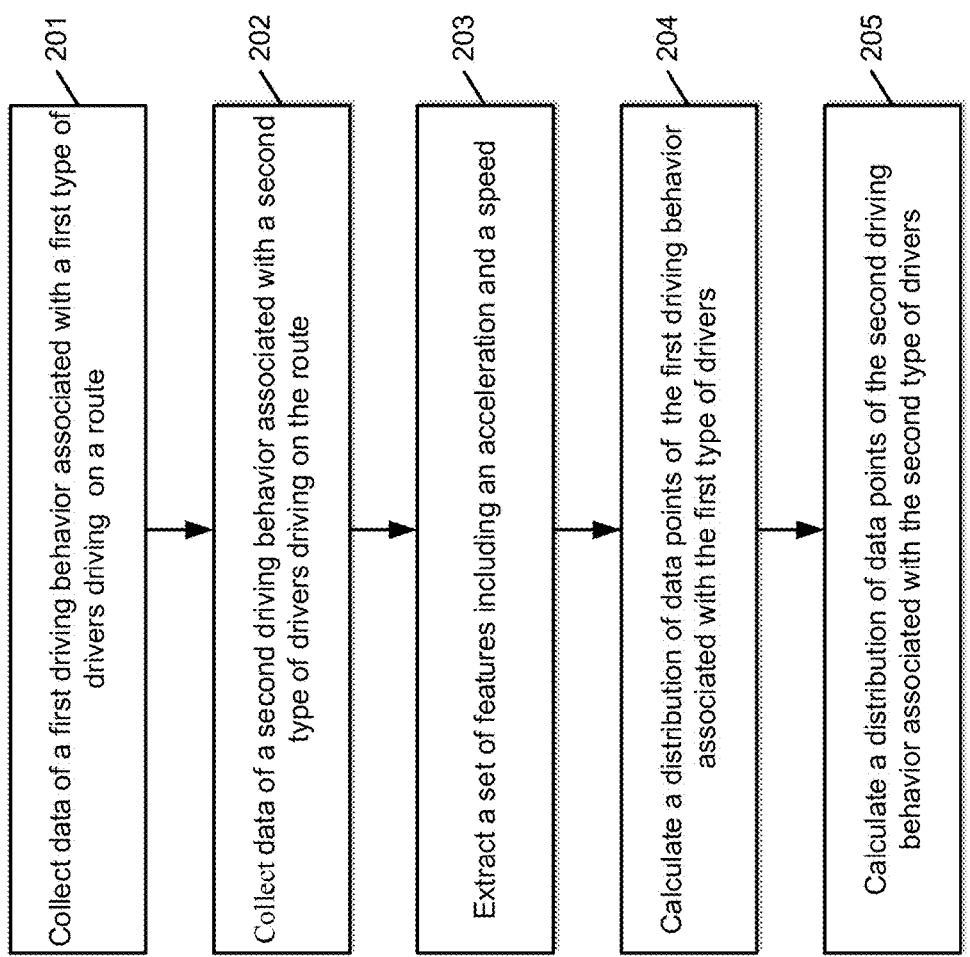
FIG. 2 is a diagram illustrating an example of evaluating a driving behavior according to one embodiment.

FIG. 2 is a flow chart illustrating an example of data collection for evaluating a driving behavior. During a data collection, data of a first driving behavior associated with a first type of drivers (e.g., good human drivers) on a route may be collected, at 201. Data of a second driving behavior associated with a second type of drivers (e.g., bad human drivers) driving on the same route may be collected, at 202. The data may include a large amount of data points. For example, the large amount of data points may be collected at a predetermined time interval. For example, good drivers may be driving on the same route, a first set of data with a first total number of data points from the good drivers may be collected. A highest comfort score, e.g., "1", may be given to the data from the first set of data. Similarly, bad drivers may be driving on the same route, a second set of data with a second total number of data points from the bad drivers may be collected. A lowest comfort score, e.g., "0", may be given to the data from the second set of data.

Information including a set of features may be extracted from the collected data, e.g., the first set of data and the second set of data, at 203. For example, the set of features may include features representing throttle/brake behaviors. The features representing the throttle/brake behaviors, such as an acceleration, a speed, etc., may be used to evaluate a riding comfort of a vehicle. The set of features may include other features indicating a driving behavior, such as a heading direction, or a change of the heading direction, or whether a vehicle is driving along a straight line, etc.

Figure 3:
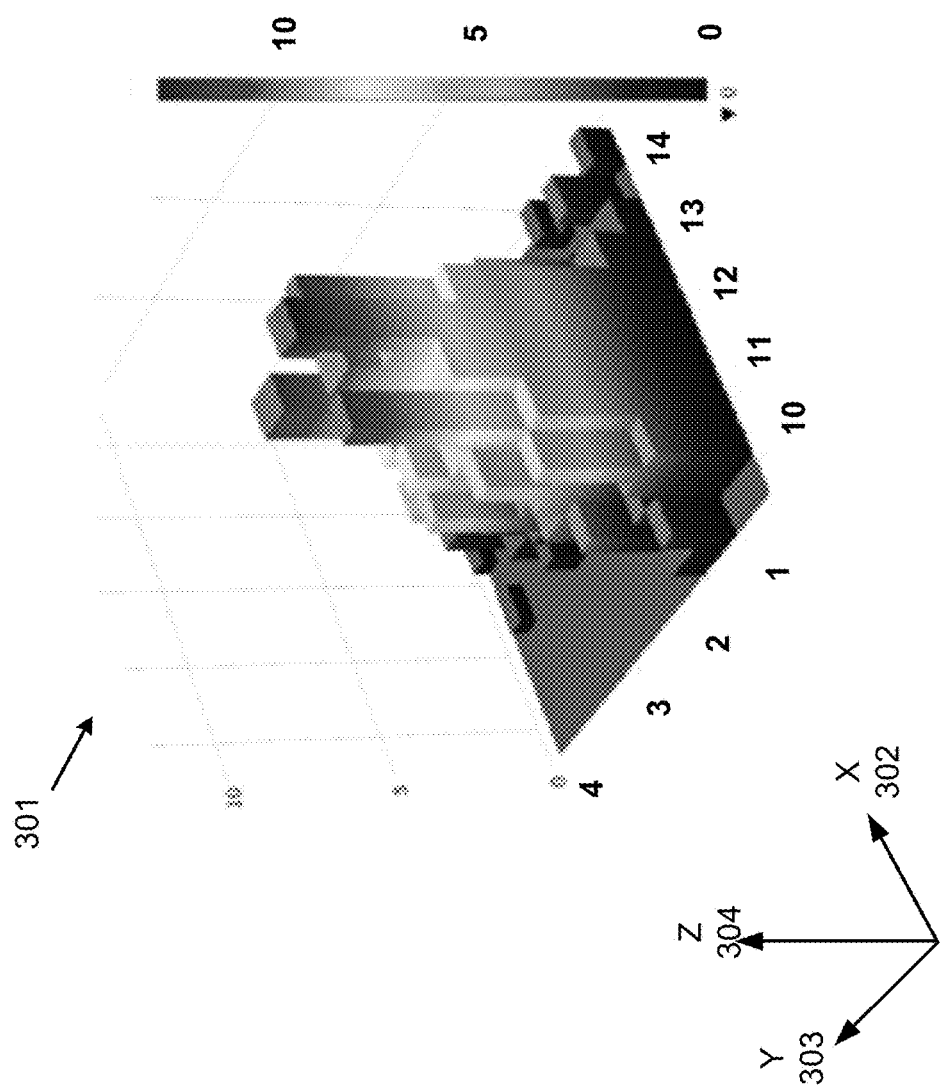
FIG. 3 is a flow chart illustrating an example of data collection for evaluating a driving behavior.

FIG. 3 is a diagram 300 illustrating an example of evaluating a driving behavior according to one embodiment. In one embodiment, the driving behavior may be evaluated by calculating a distribution of data points driving on the route with respect to a predetermined acceleration range and a predetermined speed range. For example, the distribution of the data points driving on the route with respect to the predetermined acceleration range and the predetermined speed range may be determined based on a percentage of a number of a portion of the data points in the predetermined acceleration range and the predetermined speed range over a total number of the data points.

In FIG. 3, X-axis 302 may be a speed, Y-axis 303 may be an acceleration, and Z-axis 304 may be a distribution 301 of data points. For example, FIG. 3 may illustrate a distribution of data points of a first driving behavior associated with a first type of drivers (e.g., good human drivers) on the route with respect to a predetermined acceleration range and a predetermined speed range. For another example, FIG. 3 may illustrate a distribution of data points of a second driving behavior associated with a second type of drivers (e.g., bad human drivers) on the route with respect to the predetermined acceleration range and the predetermined speed range. For yet another example, FIG. 3 may illustrate a distribution of data points of an ADV driving on the route with respect to the predetermined acceleration range and the predetermined speed range.

The distribution 301 may be a three-dimensional distribution with two keys, the speed along the X-axis 302 and the acceleration along the Y-axis 303. In one embodiment, the distribution of the data points may be determined by calculating a percentage of the number of the portion of the data points in the predetermined acceleration range and the predetermined speed range over a total number of the data points. The predetermined acceleration range may be 0.01, 0.05, 0.1, 0.2, 0.5, 1 m/s^2 or any values therebetween. For example, the predetermined acceleration range may be 0.1 m/s^2. The predetermined speed range may be 0.01, 0.05, 0.1, 0.2, 0.5, 1 m/s or any values therebetween. For example, the predetermined speed range may be 0.1 m/s. For example, there may be 5% of data points is in an acceleration range [0, 0.1 m/s^2] and a speed range [10 m/s, 10.1 m/s], thus the distribution may be 5% in the acceleration range [0, 0.1 m/s^2] and the speed range [10 m/s, 10.1 m/s]. As the distribution may be determined based on the percentage, the distribution may be normalized naturally.

Referring to FIG. 2 and FIG. 3, in one embodiment, a distribution of data points of the first driving behavior of the first type of drivers (e.g., good human drivers) with respect to the predetermined acceleration range and the predetermined speed range may be calculated, at 204. Similarly, a distribution of acceleration and speed pairs of the second driving behavior of the second type of drivers (e.g., bad human drivers) with respect to the predetermined acceleration range and the predetermined speed range may be calculated, at 205.

Figure 4:
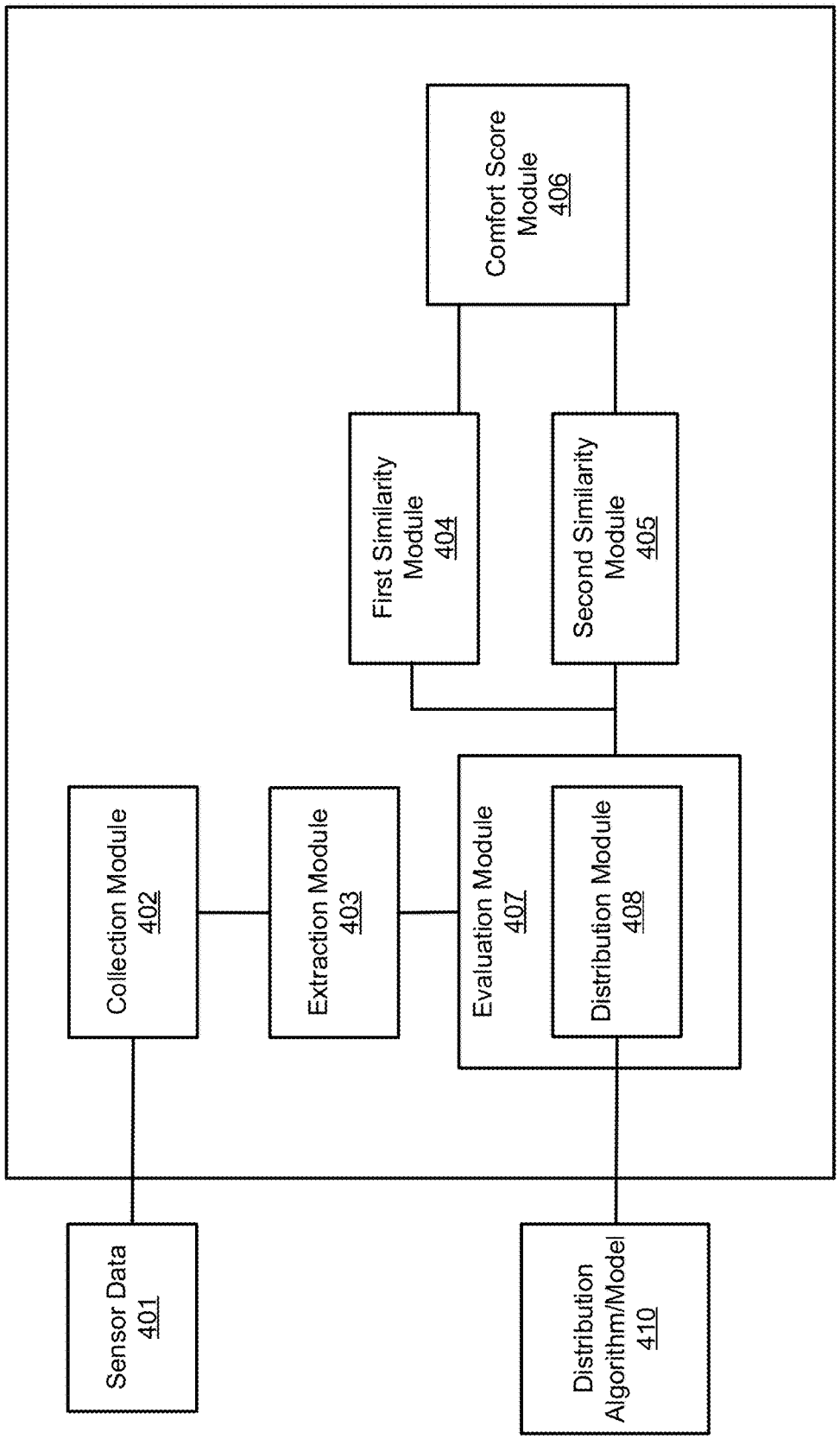
FIG. 4 is a block diagram illustrating an example of determining a comfort score of an ADV according to one embodiment.

FIG. 4 is a block diagram illustrating an example of a method of determining a comfort score of an ADV according to one embodiment. The method may be performed by a processor of an autonomous driving system (ADS) of the ADV, or a processor of a computer, a computing system, a computing device, a computing platform, a tablet, a smart phone, etc. The method may be performed by collection module 402, extraction module 403, first similarity module 404, second similarity module 405, comfort score module 406, and/or evaluation module 407 including distribution module 408, along with distribution algorithm/model 410. The collection module 402, extraction module 403, first similarity module 404, second similarity module 405, comfort score module 406, or evaluation module 407 including distribution module 408 may be a module of the processor of the ADS of the ADV, or the processor of another computer, computing system, computing device, computing platform, etc. Note that modules 402-408 may be integrated into fewer number of modules or a single module. The collection module 402, extraction module 403, first similarity module 404, second similarity module 405, comfort score module 406, and/or evaluation module 407 including distribution module 408 may work together with the distribution algorithm/model 410 to determine a comfort score of the ADV, in order to evaluate or improve a motion planning and control of the ADV. The motion planning and control of the ADV may be improved based on the comfort score of the ADV.

The ADV to be measured may be driving on a route, which may be a same route on which a first type of drivers (e.g., good human drivers) driving on and a second type of drivers (e.g., bad human drivers) driving on. Sensor data 401 obtained from a plurality of sensors mounted on the ADV driving on the same route may be collected. In one embodiment, the sensor data 410 may be collected, for example, by collection module 402. The sensor data may be input into the collection module 402. The sensor data may include a large amount of data points of the ADV driving on the route.

In one embodiment, a set of features from the sensor data may be extracted from the sensor data, for example, by extraction module 403. The set of features including an acceleration and a speed of the ADV driving on the route. The set of features may include other features indicating a driving behavior, such as a heading direction, or a change of the heading direction, or whether a vehicle is driving along a straight line, etc.

In one embodiment, an autonomous driving behavior of the ADV driving on the route may be evaluated, for example, by evaluation module 407. For example, the autonomous driving behavior may include a riding comfort. In one embodiment, the riding comfort may be evaluated based on a comfort score, which will be describe in details below.

The distribution of the data points of the ADV may be determined, for example, by distribution module 408. In one embodiment, the autonomous driving behavior of the ADV may be evaluated based on a distribution of the data points of the ADV driving on the route with respect to a predetermined acceleration range and a predetermined speed range. In one embodiment, the distribution of the data points may be determined by calculating a percentage of a number of a portion of the data points in the predetermined acceleration range and the predetermined speed range over a total number of the data points. The predetermined acceleration range may be 0.01, 0.05, 0.1, 0.2, 0.5, 1 m/s^2 or any values therebetween. The predetermined speed range may be 0.01, 0.05, 0.1, 0.2, 0.5, 1 m/s or any values therebetween. For example, the predetermined acceleration range may be 0.1 m/s^2. For example, the predetermined speed range may be 0.1 m/s. For example, the distribution of the data points may be determined by calculating a percentage of a number of a portion of the data points in every 0.1 m/s^2 acceleration range and every 0.1 m/s^2 speed range over the total number of the data points.

A first similarity between the ADV and a first driving behavior associated with the first type of drivers driving on the route may be determined based on the set of features, for example, by first similarity module 404. The distribution of the data points of the ADV driving on the route may be compared to a distribution of data points of the first driving behavior driving on the route with respect to the predetermined acceleration range and the predetermined speed range.

For example, a similarity score between two driving behaviors may be defined as below:

$$\text{Similarity Score} = \Sigma_{acceleration} \Sigma_{speed} \min(D1_{\_acc\_speed}, D2_{\_acc\_speed})$$

where $D1_{\_acc\_speed}$ represents a first distribution of data points of a first driving behavior at a certain acceleration range and a certain speed range, $D2_{acc\_speed}$ represents a second distribution of data points of a second driving behavior at a certain acceleration range and a certain speed range, $\min(D1_{\_acc\_speed}, D2_{\_acc\_speed})$ represents a minimum of $D1_{\_acc\_speed}$ and $D2_{\_acc\_speed}$. The similarity score is based on a sum of a minimum of the two distributions in all acceleration ranges and all speed ranges, which corresponds to an overlap volume of the two three dimensional distributions. Thus, the similarity score of two driving behaviors is based an overlap of the two distributions of data points of the two driving behaviors. The bigger the similarity score, the more similar the two driving behaviors. Two same distributions have a similarity score of 1.

In one embodiment, the first similarity between the ADV and the first driving behavior may be based on a first similarity score. In one embodiment, the first similarity score may be calculated based on an overlap of the distribution of the data points of the ADV driving on the route and the distribution of the data points of the first driving behavior driving on the route with respect to the predetermined acceleration range and the predetermined speed range.

A second similarity between the ADV and a second driving behavior associated with the second type of drivers driving on the route may be determined based on the set of features, for example, by second similarity module 405. The distribution of the data points of the ADV driving on the route may be compared to a distribution of data points of the second driving behavior driving on the route with respect to the predetermined acceleration range and the predetermined speed range.

In one embodiment, the second similarity between the ADV and the second driving behavior may be based on a second similarity score. In one embodiment, the second similarity score may be calculated based on an overlap of the distribution of the data points of the ADV driving on the route and the distribution of the data points of the second driving behavior driving on the route with respect to the predetermined acceleration range and the predetermined speed range.

A comfort score of the ADV may be determined, for example, by comfort score module 406, based on the first similarity score and the second similarity score. In one embodiment, assuming the first similarity score of the ADV to the first driving behavior is X, and the second similarity score of the ADV to the second driving behavior is Y, the comfort score of the ADV may be calculated as X/(X+Y). The comfort score of the ADV may be based a ratio of the first similarity score to a sum of the first similarity score and the second similarity score.

Figure 5:
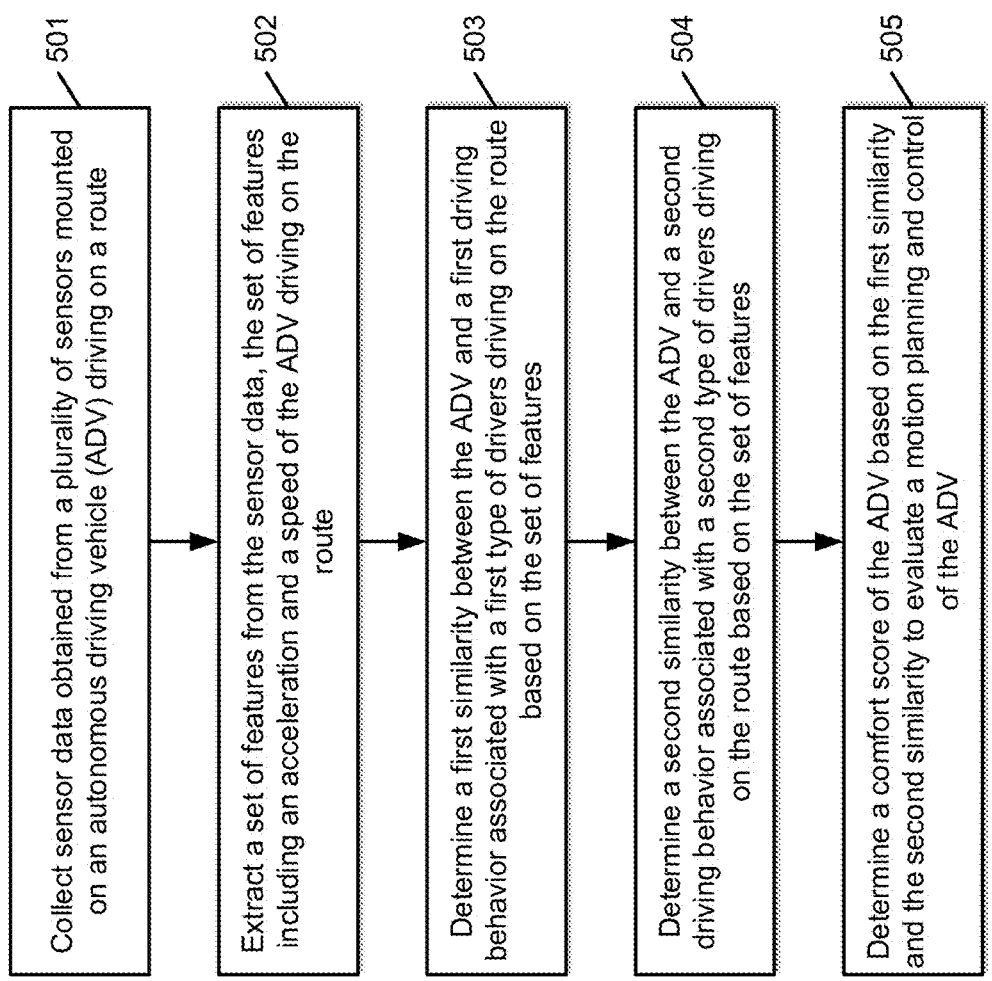
FIG. 5 is a flow diagram illustrating a process of determining a comfort score of an ADV according to one embodiment.

FIG. 5 is a flow diagram illustrating a process 500 of determining a comfort score of an ADV according to one embodiment. Process 500 may be performed by processing logic which may include software, hardware, or a combination thereof. For example, process 500 may be performed by collection module 402, extraction module 403, first similarity module 404, second similarity module 405, comfort score module 406, and/or evaluation module 407 including distribution module 408, along with distribution algorithm/model 410. The process 800 provides the objective comfort score of the ADV, which may be used to evaluate and improve a motion planning and control of the ADV.

Referring to FIG. 5, in operation 501, processing logic collects sensor data obtained from a plurality of sensors mounted on the ADV driving on a route.

In operation 502, processing logic extracts a set of features from the sensor data, the set of features including an acceleration and a speed of the ADV driving on the route.

In operation 503, processing logic determines a first similarity between the ADV and a first driving behavior associated with a first type of drivers driving on the route based on the set of features.

In operation 504, processing logic determines a second similarity between the ADV and a second driving behavior associated with a second type of drivers driving on the route based on the set of features.

In operation 505, processing logic determines a comfort score of the ADV based on the first similarity and the second similarity to evaluate a motion planning and control of the ADV.

Figure 6:
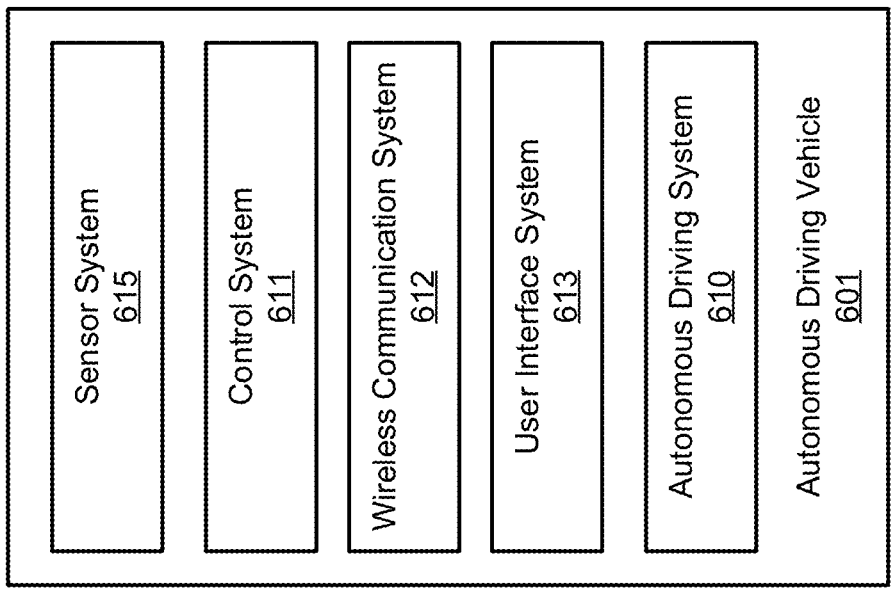
FIG. 6 is a block diagram illustrating an autonomous driving vehicle according to one embodiment.

FIG. 6 is a block diagram illustrating an autonomous driving vehicle according to one embodiment of the disclosure. Referring to FIG. 6, autonomous driving vehicle 601 may be communicatively coupled to one or more servers over a network, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server, a content server, a traffic information server, a map and point of interest (MPOI) server, or a location server, etc.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 601 can operate in a manual mode, a full autonomous mode, or a partial autonomous mode.

In one embodiment, autonomous driving vehicle 601 includes, but is not limited to, autonomous driving system (ADS) 610, vehicle control system 611, wireless communication system 612, user interface system 613, and sensor system 615. Autonomous driving vehicle 601 may further include certain common components included in ordinary vehicles, such as, an engine, wheels, steering wheel, transmission, etc., which may be controlled by vehicle control system 611 and/or ADS 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 7:
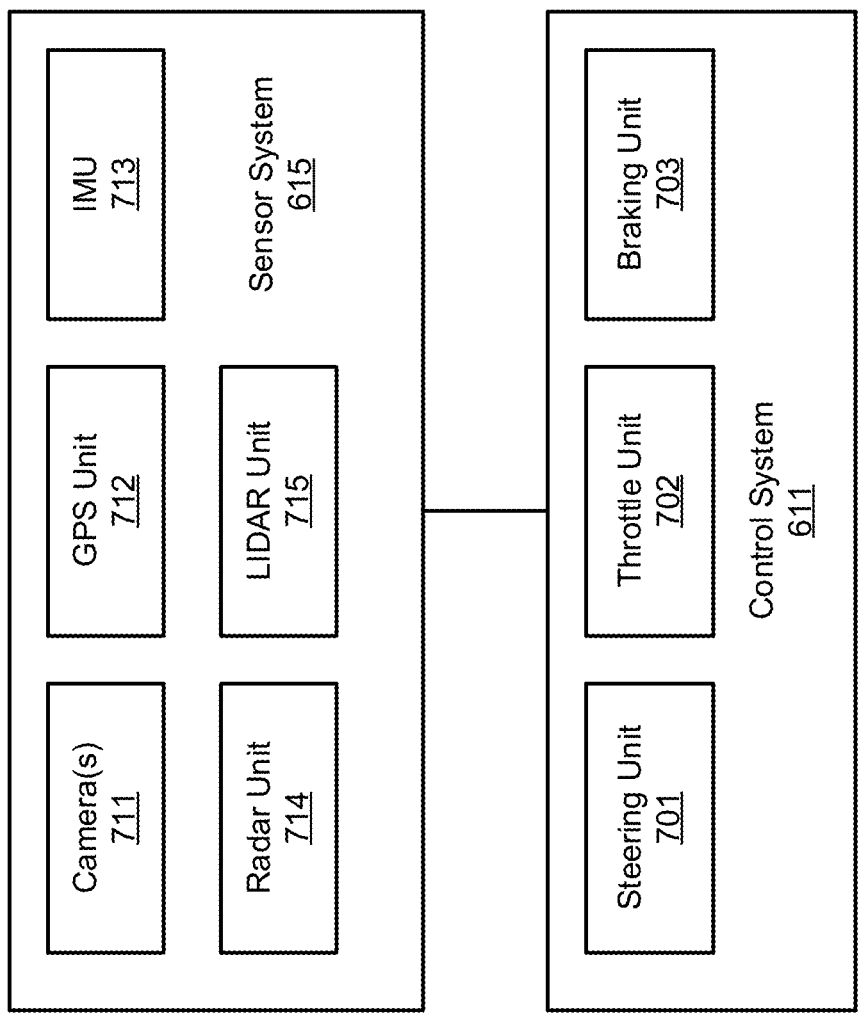
FIG. 7 is a block diagram illustrating an example of an autonomous driving vehicle according to one embodiment.

Referring now to FIG. 7, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 7 may be implemented in hardware, software, or a combination thereof.

Referring back to FIG. 6, wireless communication system 612 is to allow communication between autonomous driving vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using WiFi to communicate with another component or system. Wireless communication system 612 could communicate directly with a device (e.g., a mobile device of a passenger, a display device, a speaker within vehicle 601), for example, using an infrared link, Bluetooth, etc. User interface system 613 may be part of peripheral devices implemented within vehicle 601 including, for example, a keyboard, a touch screen display device, a microphone, and a speaker, etc.

Some or all of the functions of autonomous driving vehicle 601 may be controlled or managed by ADS 610, especially when operating in an autonomous driving mode. ADS 610 includes the necessary hardware (e.g., processor(s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, ADS 610 may be integrated with vehicle control system 611.

For example, a user as a passenger may specify a starting location and a destination of a trip, for example, via a user interface. ADS 610 obtains the trip related data. For example, ADS 610 may obtain location and route data from an MPOI server. The location server provides location services and the MPOI server provides map services and the POIs of certain locations. Alternatively, such location and MPOI information may be cached locally in a persistent storage device of ADS 610.

While autonomous driving vehicle 601 is moving along the route, ADS 610 may also obtain real-time traffic information from a traffic information system or server (TIS). Note that the servers may be operated by a third party entity. Alternatively, the functionalities of the servers may be integrated with ADS 610. Based on the real-time traffic information, MPOI information, and location information, as well as real-time local environment data detected or sensed by sensor system 615 (e.g., obstacles, objects, nearby vehicles), ADS 610 can plan an optimal route and drive vehicle 601, for example, via control system 611, according to the planned route to reach the specified destination safely and efficiently.

Figure 8:
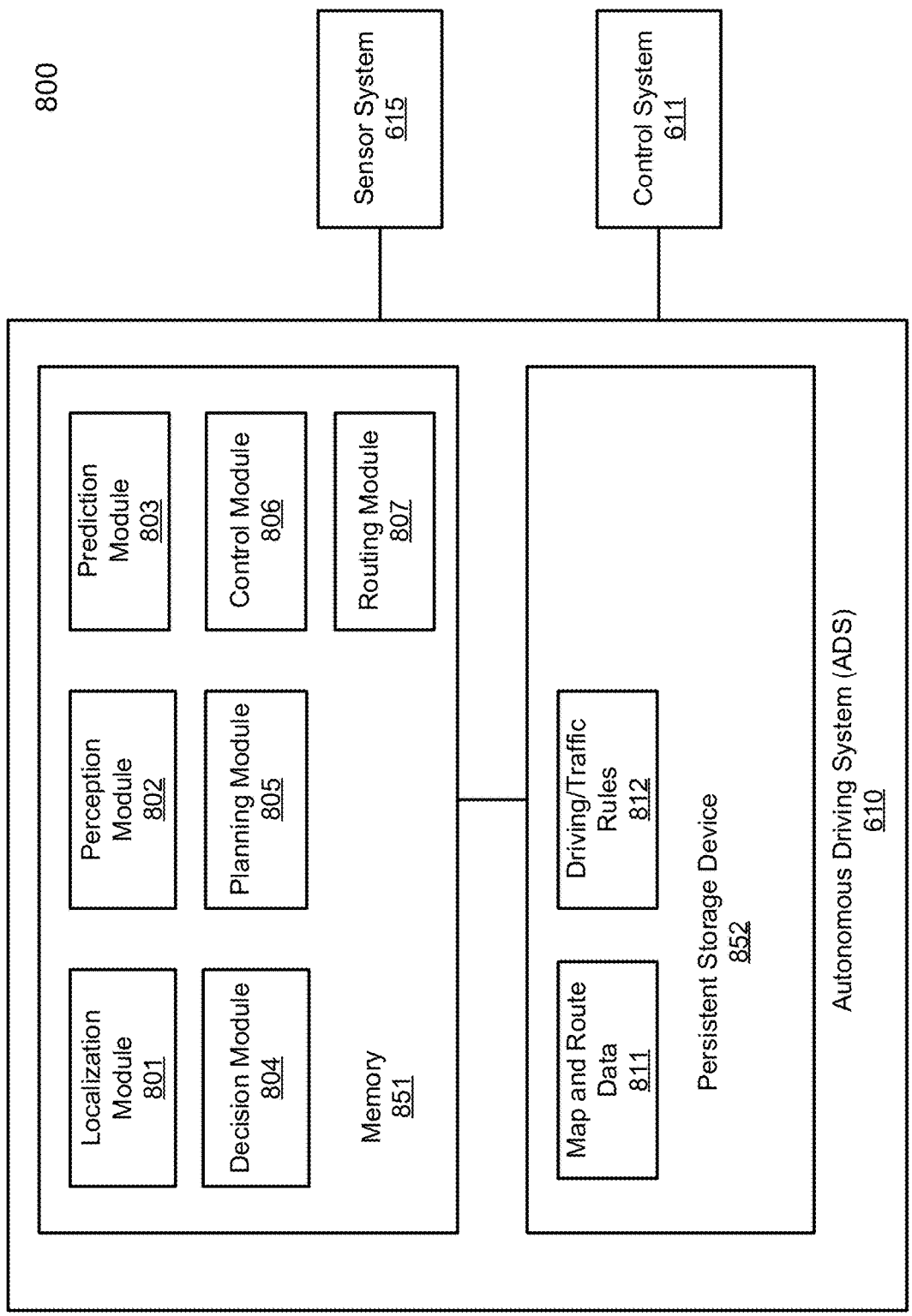
FIG. 8 is a block diagram illustrating an example of an autonomous driving system used with an autonomous driving vehicle according to one embodiment.

FIG. 8 is a block diagram illustrating an example of an autonomous driving system used with an autonomous driving vehicle according to one embodiment. System 800 may be implemented as a part of autonomous driving vehicle 601 of FIG. 6 including, but is not limited to, ADS 610, control system 611, and sensor system 615. Referring to FIG. 8, ADS 610 includes, but is not limited to, localization module 801, perception module 802, prediction module 803, decision module 804, planning module 805, control module 806, routing module 807.

Some or all of modules 801-807 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 7. Some of modules 801-807 may be integrated together as an integrated module.

Localization module 801 determines a current location of autonomous driving vehicle 300 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 300, such as map and route data 811, to obtain the trip related data. For example, localization module 801 may obtain location and route data from a location server and a map and POI (MPOI) server. A location server provides location services and an MPOI server provides map services and the POIs of certain locations, which may be cached as part of map and route data 811. While autonomous driving vehicle 300 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   collecting sensor data obtained from a plurality of sensors mounted on an autonomous driving vehicle (ADV) driving on a route;
   extracting a set of features from the sensor data, the set of features including an acceleration and a speed of the ADV driving on the route;
   determining a first similarity between the ADV and a first driving behavior associated with a first type of drivers driving on the route based on the set of features;
   determining a second similarity between the ADV and a second driving behavior associated with a second type of drivers driving on the route based on the set of features;
   determining a comfort score of the ADV based on the first similarity and the second similarity to evaluate a motion planning and control of the ADV.

2. The method of claim 1, further comprising evaluating an autonomous driving behavior of the ADV driving on the route based on the set of features.

3. The method of claim 2, wherein the evaluating the autonomous driving behavior of the ADV driving on the route comprises determining a distribution of data points of the ADV driving on the route with respect to a predetermined acceleration range and a predetermined speed range.

4. The method of claim 3, wherein the distribution of data points of the ADV driving on the route with respect to the predetermined acceleration range and the predetermined speed range is determined based on a percentage of a number of a portion of the data points in the predetermined acceleration range and the predetermined speed range over a total number of the data points.

5. The method of claim 3, further comprising comparing the distribution of the data points of the ADV driving on the route to a distribution of data points of the first driving behavior driving on the route with respect to the predetermined acceleration range and the predetermined speed range.

6. The method of claim 3, wherein the first similarity between the ADV and the first driving behavior is based on a first similarity score, and wherein the first similarity score is calculated based on an overlap of the distribution of the data points of the ADV driving on the route and the distribution of the data points of the first driving behavior driving on the route with respect to the predetermined acceleration range and the predetermined speed range.

7. The method of claim 3, further comprising comparing the distribution of the data points of the ADV driving on the route to a distribution of data points of the second driving behavior driving on the route with respect to the predetermined acceleration range and the predetermined speed range.

8. The method of claim 3, wherein the second similarity between the ADV and the second driving behavior is based on a second similarity score, and wherein the second similarity score is based on calculating an overlap of the distribution of the data points of the ADV driving on the route and the distribution of the data points of the second driving behavior driving on the route with respect to the predetermined acceleration range and the predetermined speed range.

9. The method of claim 1, wherein the comfort score of the ADV is based a ratio of a first similarity score to a sum of the first similarity score and a second similarity score.

10. A non-transitory machine-readable medium having instructions stored therein, which when executed by a processor, cause the processor to perform operations, the operations comprising:
    collecting sensor data obtained from a plurality of sensors mounted on an autonomous driving vehicle (ADV) driving on a route;
    extracting a set of features from the sensor data, the set of features including an acceleration and a speed of the ADV driving on the route;
    determining a first similarity between the ADV and a first driving behavior associated with a first type of drivers driving on the route based on the set of features;
    determining a second similarity between the ADV and a second driving behavior associated with a second type of drivers driving on the route based on the set of features;
    determining a comfort score of the ADV based on the first similarity and the second similarity to evaluate a motion planning and control of the ADV.

11. The medium of claim 10, wherein the operations further comprise evaluating an autonomous driving behavior of the ADV driving on the route based on the set of features.

12. The medium of claim 11, wherein the evaluating the autonomous driving behavior of the ADV driving on the route comprises determining a distribution of data points of the ADV driving on the route with respect to a predetermined acceleration range and a predetermined speed range.

13. The medium of claim 12, wherein the distribution of data points of the ADV driving on the route with respect to the predetermined acceleration range and the predetermined speed range is determined based on a percentage of a number of a portion of the data points in the predetermined acceleration range and the predetermined speed range over a total number of the data points.

14. The medium of claim 12, wherein the first similarity between the ADV and the first driving behavior is based on a first similarity score, and wherein the first similarity score is calculated based on an overlap of the distribution of the data points of the ADV driving on the route and the distribution of the data points of the first driving behavior driving on the route with respect to the predetermined acceleration range and the predetermined speed range.

15. The medium of claim 12, wherein the second similarity between the ADV and the second driving behavior is based on a second similarity score, and wherein the second similarity score is based on calculating an overlap of the distribution of the data points of the ADV driving on the route and the distribution of the data points of the second driving behavior driving on the route with respect to the predetermined acceleration range and the predetermined speed range.

16. The medium of claim 10, wherein the comfort score of the ADV is based a ratio of a first similarity score to a sum of the first similarity score and a second similarity score.

17. A data processing system, comprising:
    a processor; and
    a memory coupled to the processor to store instructions, which when executed by the processor, cause the processor to perform operations, the operations including collecting sensor data obtained from a plurality of sensors mounted on an autonomous driving vehicle (ADV) driving on a route;

extracting a set of features from the sensor data, the set of features including an acceleration and a speed of the ADV driving on the route;

determining a first similarity between the ADV and a first driving behavior associated with a first type of drivers driving on the route based on the set of features;

determining a second similarity between the ADV and a second driving behavior associated with a second type of drivers driving on the route based on the set of features;

determining a comfort score of the ADV based on the first similarity and the second similarity to evaluate a motion planning and control of the ADV.

18. The system of claim 17, wherein the operations further comprise evaluating an autonomous driving behavior of the ADV driving on the route based on the set of features.

19. The system of claim 18, wherein the evaluating the autonomous driving behavior of the ADV driving on the route comprises determining a distribution of data points of the ADV driving on the route with respect to a predetermined acceleration range and a predetermined speed range.

20. The system of claim 19, wherein the distribution of data points of the ADV driving on the route with respect to the predetermined acceleration range and the predetermined speed range is determined based on a percentage of a number of a portion of the data points in the predetermined acceleration range and the predetermined speed range over a total number of the data points.

\* \* \* \* \*